United States Patent [19]

Trimmel

[11] 4,385,387
[45] May 24, 1983

[54] PRECONDUCTION CURRENT CONTROL OF LASER DIODES

[75] Inventor: Herwig Trimmel, Puchheim, Fed. Rep. of Germany

[73] Assignee: Siemens Aktiengesellschaft, Berlin & Munich, Fed. Rep. of Germany

[21] Appl. No.: 307,006

[22] Filed: Sep. 30, 1981

Related U.S. Application Data

[63] Continuation of Ser. No. 73,898, Sep. 10, 1979.

[30] Foreign Application Priority Data

Sep. 22, 1978 [DE] Fed. Rep. of Germany ....... 2841433

[51] Int. Cl.³ .............................................. H01S 3/13
[52] U.S. Cl. ......................................... 372/29; 372/26
[58] Field of Search ..................................... 372/26, 29

[56] References Cited

U.S. PATENT DOCUMENTS

| | | | |
|---|---|---|---|
| 3,815,045 | 6/1974 | Ito ......................................... | 372/26 |
| 3,898,583 | 8/1975 | Shuey ................................... | 372/29 |
| 3,946,335 | 3/1976 | DeLoach, Jr. et al. ............... | 372/38 |
| 4,009,385 | 2/1977 | Sell ........................................ | 372/38 |
| 4,019,048 | 4/1977 | Maione et al. ........................ | 372/38 |
| 4,081,670 | 4/1978 | Albanese .............................. | 372/38 |
| 4,109,217 | 8/1978 | Brackett et al. ...................... | 372/38 |

Primary Examiner—William L. Sikes
Assistant Examiner—Léon Scott, Jr.
Attorney, Agent, or Firm—Hill, Van Santen, Steadman, Chiara & Simpson

[57] ABSTRACT

The invention relates to a method for the control of the preconduction current for laser diodes which are employed as light transmitters in the transmission stages of light wave guide transmission systems. In such laser diodes, a sharp bend occurs in the lower part of the light current characteristic curve which separates an upper characteristic curve area with great steepness from a lower characteristic curve area with minimum steepness and comparatively high cut-in retardation. Therefore, such laser diodes are operated with a preconduction current whose magnitude corresponds to the threshold current occurring in the characteristic curve bend. Due to aging and temperature influences, displacements of the characteristic curve bend can occur so that a control of the preconduction current is required. To this end, the invention provides that an oscillation of comparatiely lower frequency and low amplitude be superimposed on the preconduction current. A part of the light emitted by the laser diode is monitored for the occurrence of this additional oscillation. The inventive preconduction current regulation of laser diodes is particularly employable in light wave guide transmission systems with high transmission velocities.

12 Claims, 5 Drawing Figures

PRECONDUCTION CURRENT CONTROL OF LASER DIODES

This is a continuation of application Ser. No. 73,898, filed Sept. 10, 1979.

BACKGROUND OF THE INVENTION

1. Field of the Invention

The invention relates to a method for the control of the preconduction currents supplied to laser diodes that are employed as light transmitters in the transmission stages of signal transmission systems with light wave guides.

(1) in technical literature described as "bias current"

2. The Prior Art

Digital wave guide transmission systems as a rule incorporate gallium-aluminum arsenide laser diodes as optical transmitters especially given high transmission velocities. Such laser diodes have a bend light/current characteristic curve which is illustrated, for example, in FIG. 2b. A current Ith occurring at the bend of the characteristic curve is hereby designated as a threshold current. A cut-in delay (2) as well as a rectifier effect for the modulation current flowing through the laser diode is produced by means of this threshold. Such a cut-in delay is not acceptable, particularly in the transmission of digital signals with high bit rates. Therefore the laser diode is usually supplied with a pre-conduction current Io which largely corresponds to the threshold current in its magnitude. Since, however, both the threshold current as well as the steepness of the subsequent characteristic curve branch of the laser diode depend on temperature and aging, a control for the threshold current is required.

(2) in technical literature described as "switch-on delay"
(3) in technical literature described as "external quantum efficiency"

A known, mean value, control has been constructed such that the absolute light output power of the laser diode is measured with the assistance of a photoreceiver and is compared with in index value which has been set. Given a deviation of the light output from the index value, the preconduction current of the laser diode is readjusted to control the means light output of the diode in such manner that the difference between the actual value and index value of the light output power is minimized or disappears. In this type of control, however, one cannot distinguish between a change in the threshold current and a change in the steepness of the laser diode characteristic curve. In this type of control, a decrease of the steepness would lead to an excessive increase of the preconduction current above the threshold current and of necessity diminish the possible modulation deviation. By so doing, the main light output then contains a steady light part that is too large which leads to an increased receiver noise and, moreover, reduces the part of the modulated light.

In another known control circuit with a peak value and a steady light control, both the preconduction current as well as the modulation current are tracked via two separate control loops. The control of the modulation current, not discussed further below is achieved by measuring the peak value of the light output. On the other hand, the control of the preconduction current, the magnitude proportional to the steady light part of the laser diode, is achieved by forming the difference between the peak value and mean value of the light output. However, the sensitivity of the control circuit is increased greatly as a result of forming the difference between two values having magnitudes of nearly the same size. Small amplification changes in the amplifiers required for the measurement of the peak and mean values can result in large or substantial output errors. This is particularly critical given high bit rates. At high bit rates, a great amplifier band-width is necessary resulting in only a small feed-back factor, and, additionally, the permissable deviation of the preconduction current from the desired value is very small in order to keep the time delay of cutting-in the laser diode very small.

The cited control circuits have a common disadvantage which derives from the measurement of the light of the laser diode. Namely, it is not the light emitted from the laser diode to the light wave guide segment which is measured, but, rather, the light emitted by the back mirror of the laser diode. Given a varying aging of the two mirrors, output errors of necessity are produced.

A further known control circuit is based on the temporal retardation between the cutting-in of the current pulse and the commencement of the stimulated emission in the laser diode. Prerequisite for this, however, is that the preconduction current is always smaller than the threshold current. This precondition, however, does not apply with respect to the transmission of digital signals with very high bit rates.

SUMMARY OF THE INVENTION

The invention is an improved mean value method and apparatus of controlling the preconduction current of a laser diode in a simple manner. The method includes sensing of threshold current and output light vs. current steepness so that temperature and aging dependent variations may also be compensated. Additionally, the method, as far as possible, senses the amount of light supplied to the light wave guide.

A periodic oscillation with a low frequency and small amplitude in comparison to the transmission or modulation signal is superimposed on the preconduction curent. A part of the light emitted by the laser diode whose preconduction current is to be controlled is sensed and converted into an electric signal; this electric signal is amplified in a broad-band amplifier and is subjected to a peak value rectification in order to generate a control signal; the control signal is compared with a standard signal; the mean value of the output signal from the comparator is an error signal that is then amplified to control or adjust the preconduction current. An advantage of the inventive method is that the absolute value of the light output is not required for the control; another is that amplification changes and differing transmittances of the two mirrors of the laser diode have no influence on the precision of the control; another is that, within a certain range, the preconduction current can be set both smaller as well as larger than the threshold current of the laser diode. By so doing, an optimum pulse reproduction can be achieved even given high bit rates of the transmitted digital signal.

A preferred embodiment of the improved apparatus practising the inventive method superimposes a sinusoidal oscillation on the preconduction current.

The inventive method can be broadly employed. The transmission signal can be not only a digital signal; but also it could be an amplitude-discrete analog signal that is preferably frequency or pulse-position modulated.

In the preferred improved apparatus practising the method, the frequency of the sinusoidal oscillation is approximately 10 kilohertz for easy measurability and the amplitude of the sinusoidal oscillation amounts to approximately 1% of the preconduction current amplitude in order to avoid disruptions in the transmission of the digital signal.

For the purpose of simple construction of the apparatus based on the inventive method, it is expedient that the control signal be compared with the standard signal with respect to the length of the negative half wave.

One form of apparatus practicing the inventive method includes a wide-band amplifier which amplifies only the modulated portion of an electrical signal corresponding to the modulated light from the laser diode. The wide-band amplifier electrical output signal is then demodulated producing a relatively low frequency DC type signal which has a variation in amplitude corresponding to the time interval when the pilot signal has an amplitude which is below the threshold current of the laser diode. The demodulated DC type signal is compared to a reference in a comparator. The output signal from the comparator is then integrated and amplified to produce an error signal which may then be fed back to the electrical source generating the preconduction current.

In a second form of an apparatus practicing the inventive method a second comparator is introduced to compensate for a second break-point in the light-current characteristic curve of the laser diode. Further, a third comparator is introduced to compensate for aging and temperature dependencies.

DETAILED DESCRIPTION OF THE PREFERRED EMBODIMENTS

Not by way of limitation but by way of disclosing the best mode of practicing my invention and by way of enabling one skilled in the art to practice my invention there are disclosed in FIGS. 1-5 two embodiments of my invention.

Figure 1:
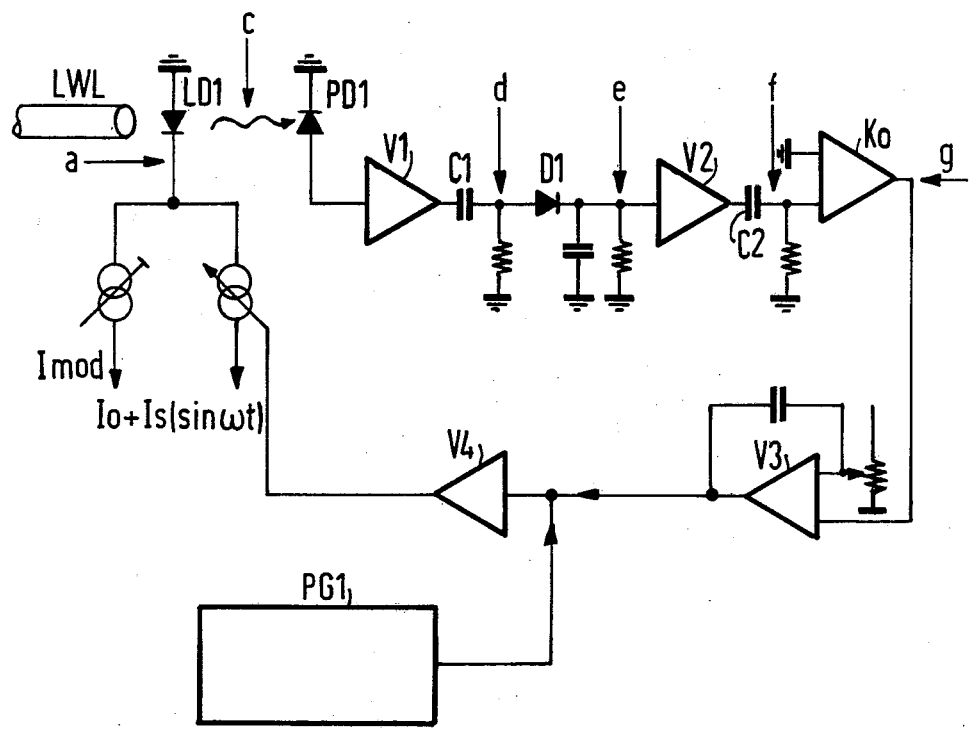
FIG. 1 is a schematic of a basic circuit for the preconduction current control of laser diodes.
Figure 2:
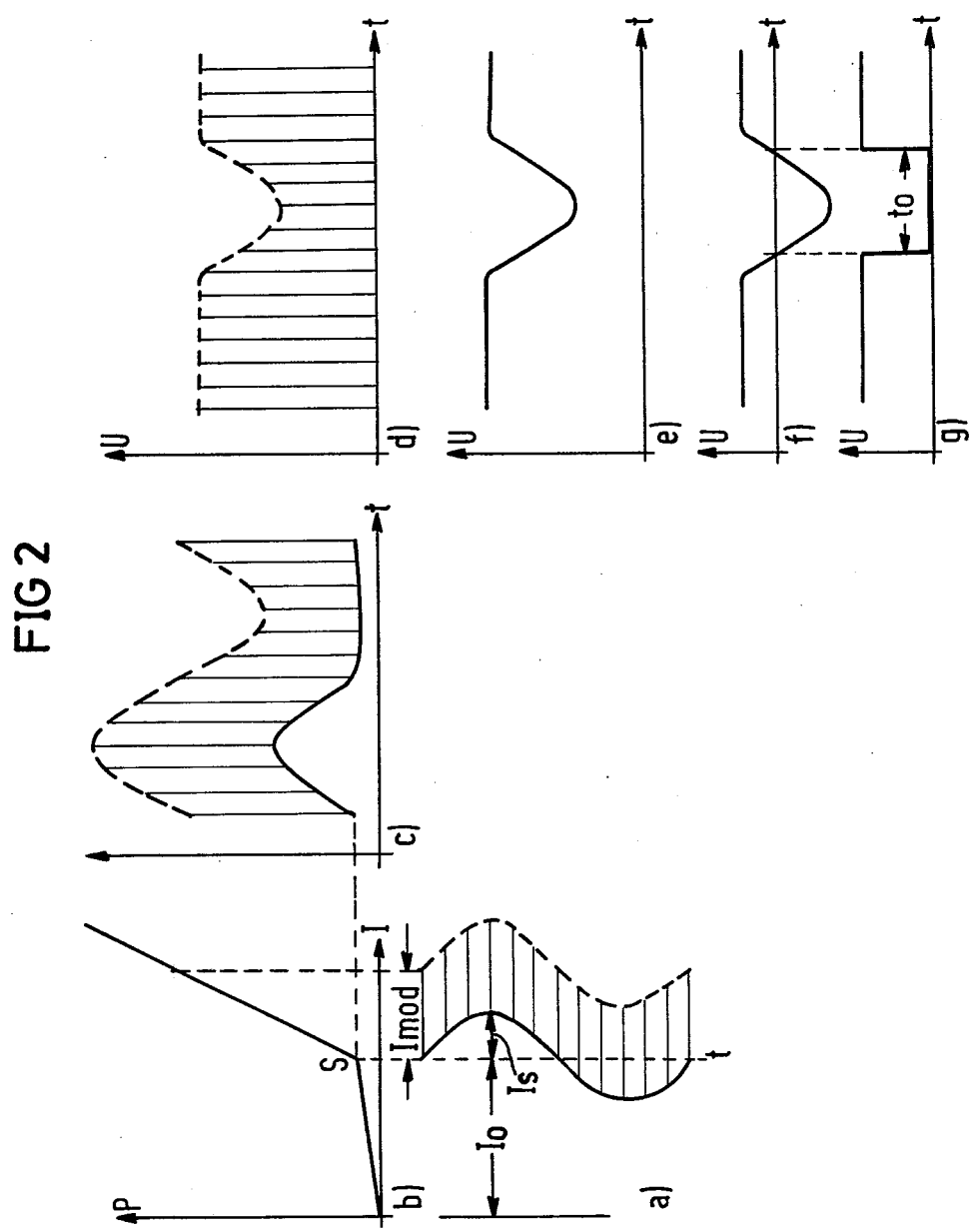
FIG. 2 is a set of waveforms which assist in understanding the operation of the circuit of FIG. 1.

The laser diode under consideration is referenced with LD1 in FIG. 1, said laser diode being optically coupled to a light wave guide LWL and to which a control current is supplied at point a. The control current is composed of the modulation current Imod and the preconduction current Io with superimposed sinusoidal pilot signal current Is (sin $\omega$t). The maximum amplitude of the pilot signal current has a value equal to 1% of the amplitude of the preconduction current Io with a frequency of 10 kHz. In FIG. 2, the current occurring at point a is illustrated by subfigure (a), the light-current characteristic curve of the laser diode is illustrated at subfigure (b) and the further signals occurring in FIG. 1 are illustrated in subfigures in FIG. 2 under the same symbols as in FIG. 1. It can be seen from FIG 2b that the light-current characteristic curve of the laser diode has in toto a non-linear course through the threshold S. Thereby, certain distortions of the pilot signal ensue in the optical output signal of the laser diode which result in a measure for the deviation of the preconduction current Io from the actual threshold current Ith. As can be seen from FIG. 2, the current/light conversion ensues without distortion during the positive half wave of the pilot signal since the laser diode is operated in the conducting, linear, part of the laser characteristic curve during this half wave. During the negative half wave of the pilot signal, only one part of the modulation current lies above the threshold current. As a result, a smaller change in the light emitted by the laser diode occurs during the negative half wave.

The emitted light c is illustrated in FIG. (2c). The light c is received by a photo diode PD1, converted into an electric signal and, by so doing, a voltage is generated at a terminating impedance. A broad-band alternating current amplifier V1 is connected with the terminating impedance. The alternating current amplifier V1 exhibits a relatively high lower cut-off or limiting, frequency. As a result, only the high frequency voltage signals, corresponding to the modulating current Imod, are amplified. The signal at point d at the output of the amplifier V1, reflects the decrease in modulated light output c, due to the pilot signal having a negative value. The signal at point d after a peak value rectification by means of the connected diode D1, becomes a demodulated, relatively low frequency signal at the point e.

After further amplification in the second amplifier V2, the direct voltage part is separated by means of the second capacitor C2 so that the signal at point f as shown in subfigure (2f) results. This signal is supplied to a comparator Ko whose output signal at a point g is illustrated and in subfigure (2g). The comparator Ko of a standard type is adjusted in such manner that the duration, "to", of the zero pulse (see subfigure 2g) lies at 0.8 $\pi\omega$ of the pilot signal, whereas the mark-to-space ratio of the interval "to" lies at 0.4 with reference to 2 $\pi\omega$ of the pilot signal. A subsequent integration of the output signal of the comparator Ko produces a direct voltage which is proportional to the said mark-to-space ratio.

Given an increase of the actual threshold current of the diode LD1, the duration, "to", of the zero pulse is increased so that the value of the integrated direct voltage generated is reduced and its inverse value is increased. In the opposite case, i.e., given a reduction of the actual threshold current of the diode LD1, the duration, "to", of the zero pulse is reduced. The value of the inverse direct voltage is also reduced. The inverse direct voltage generated is further amplified in the third amplifier V3, a controlled-gain amplifier, and is supplied to the fourth amplifier V4 functioning as a driver stage. Additionally, the generator PG1 for the pilot signal is connected with the input of the fourth amplifier V4.

FIG. 3a again illustrates the light-current characteristic curve of the laser diode employed together with the modulation current supplied, the laser output signal c' or, respectively, c'' respectively arising and the shape of the control voltage after peak value rectification at 3' or, respectively e'' for two different values of preconduction current. It is assumed, in the case of FIG. 3a, that the preconduction current is smaller than the threshold current Ith. FIG. 3b, the preferred case for transmission of high bit rates illustrates the shape of the control voltage e" where the preconduction current Io slightly exceeds the threshold current Ith.

Figure 3:
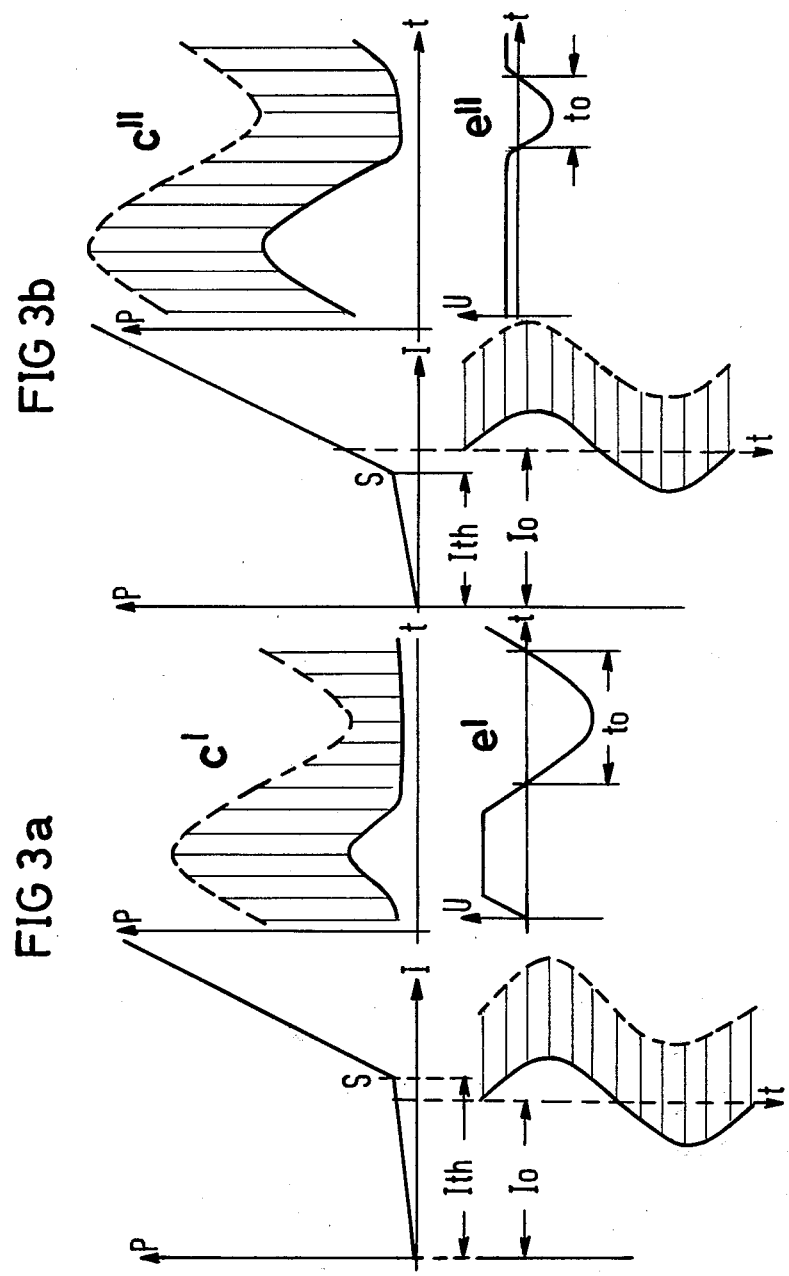
FIG. 3 is a set of waveforms showing in FIG. 3a the laser output signal and the control voltage after a peak value rectification and capacitor coupling where the preconduction current is smaller than the threshold current and, in FIG. 3b the corresponding signals given a preconduction current exceeding the threshold current.
Figure 4:
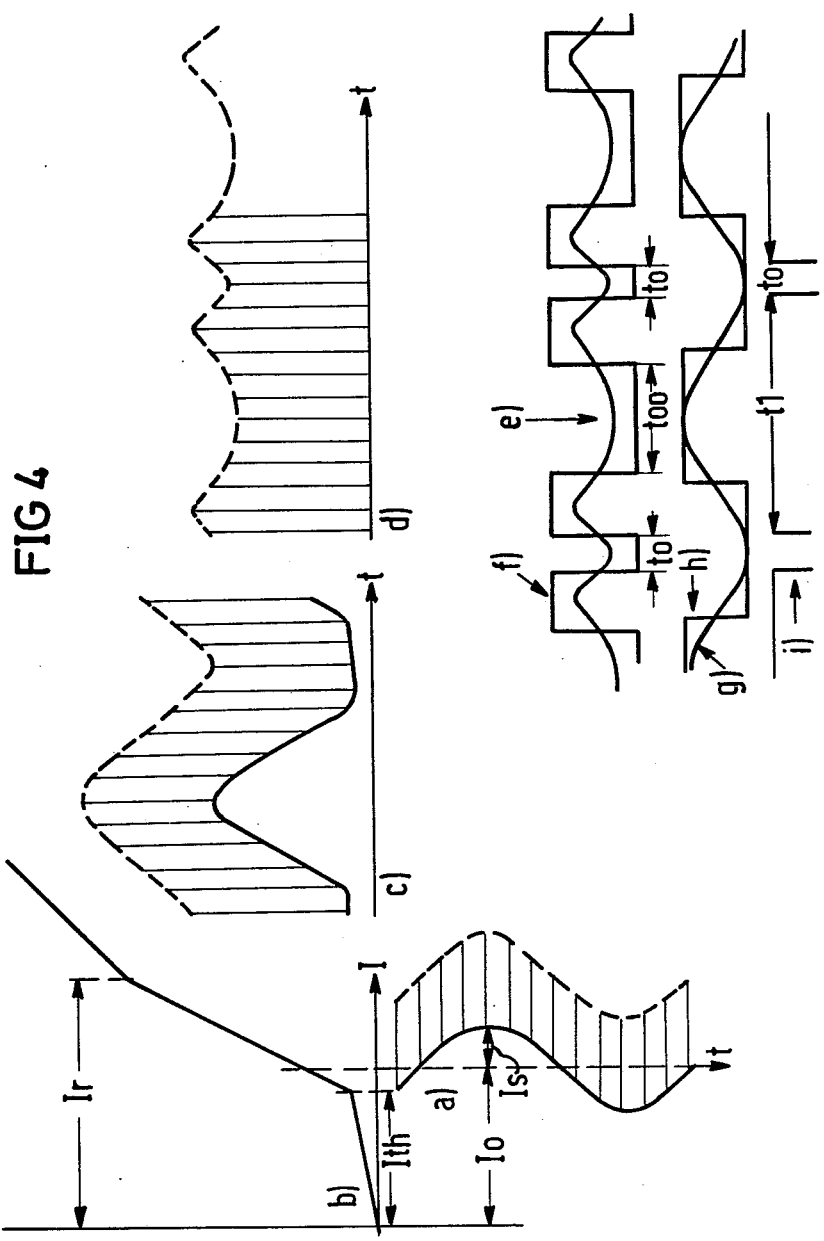
FIG. 4 is a set of waveforms of the signals occurring in the schematic shown in FIG. 5.

It was respectively assumed in FIGS. 2 and 3 that the characteristic curve branch of the laser diode situated above the threshold S is linear. In fact, however, given light outputs of approximately 10 mW, a second bend of the light-current characteristic curve of the laser diode occurs by means of which the steepness is again reduced. Thereby, given sufficiently great variation of the current supplied to the laser diode LD1, the pulse amplitude during the positive half wave of the pilot signal exhibits distortion. This effect occurs in addition to the decrease of the optical pulse amplitude during the negative half wave of the pilot signal. These relationships are illustrated in FIG. 4. There, the control signal is again illustrated in subfigure (a), whereas subfigure (b) shows the light-current characteristic curve of the laser diode LD1 with a second bend at current Ir. Due to this second bend in the characteristic curve, a respectively additional zero pulse occurs which leads to a phase displacement of the light voltage and could therefore interfere with the preconduction current adjustment.

Figure 5:
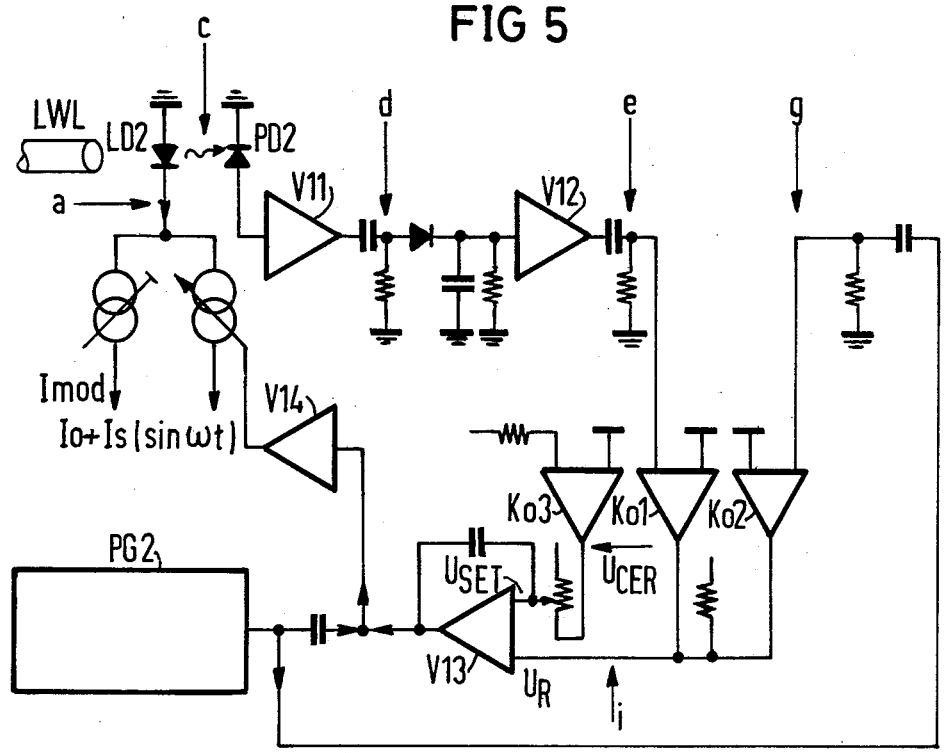
FIG. 5 is a schematic of an improved circuit for controlling preconduction current.

In view of the aforementioned presence of an additional zero pulse due to the second bend of the laser characteristic curve, the circuit arrangement of FIG. 1 was modified in the manner illustrated in FIG. 5. The circuit arrangement according to FIG. 5, like that according to FIG. 1, contains a laser diode LD2, a photo diode PD2 optically coupled with the diode LD2, and a postconnected first or, respectively, second amplifier VII or, respectively, V12 with a connected comparator Kol, a controlled-gain amplifier V13, a driver amplifier V14 and a pilot generator PG2.

In addition, a second and a third comparator Ko2 and Ko3 are provided. The second comparator Ko2 is controlled by means of the pilot generator PG2 and generates a rectangular signal at its output which, during the positive half wave of the pilot signal, is equal to logical "1" and, during the negative half wave of the pilot signal, is equal to logical "0". By means of a connection of the outputs of the first and of the second comparator Ko1 and Ko2 in the form of a wired OR circuit, there ensues the desired blanking out of the interfering, additional zero pulse which is designated "too", in FIG. 4. A third comparator Ko3 was provided in the arrangement according to FIG. 5. The output of comparator Ko3 is always conducting current, and, as a result has an output voltage at the collector residual voltage. At the output of the comparator Ko3, the collector resistance of the transistor employed is separately illustrated, at which the reference voltage of the setting of the operating point for the controlled-gain amplifier V13 is tapped or adjusted. By means of the additional comparator Ko3 for generating the reference voltage, there ensues a compensation with respect to the generation of the laser diode preconduction current Io with respect to temperature changes and changes of the supply voltages.

Although various modifications might be suggested by those skilled in the art, it should be understood that I wish to embody within the scope of the patent warranted hereon all such modifications as reasonably and properly come within the scope of my contribution to the art.

I claim as my invention;

1. A method of adjusting a bias current supplied to a laser diode to a threshold current value of the laser diode, whereat the diode begins to emit substantial quantities of light, by means of a control circuit which includes a bias current generator, a pilot signal generator, a sensor to convert light emitted by the laser diode to an electrical signal, a high frequency amplifier, a peak value rectifier, a comparator and an averager, the method comprising the steps of:
   superimposing an oscillatory pilot signal generated by the pilot signal generator on the bias current generated by the bias current generator;
   supplying a high frequency modulating electrical signal from a source of data to the laser diode;
   sensing a portion of the light emitted from the laser diode and
   converting the sensed light emitted by the laser diode into a corresponding electrical signal by means of the sensor;
   amplifying selected high frequency components of the electrical signal by means of the high frequency amplifier;
   rectifying the amplified signal by means of the peak value rectifier;
   comparing a selected region of the rectified electrical signal to a reference signal and generating an output signal whose value is indicative of the results of the comparison by means of the comparator;
   forming a mean value of the output signal in the averager;
   adjusting the value of the bias current to correspond to the threshold current value of the laser diode in response to the mean value of the output signal.

2. Method for the control of a preconduction current supplied to a laser diode which is employed as a light transmitter in a transmission stage of a signal transmission system with light wave guide signals, by means of a control circuit which includes a preconduction current generator, an oscillator adapted to generate periodic oscillations, a sensor to sense light generated by the laser diode and to generate an electrical signal proportional thereto, a broad band amplifier, a rectifier, a comparator and an averager, the method comprising the steps of:
   supplying a preconduction current generated by the preconduction current generator to the laser diode;
   superimposing a periodic oscillation from the oscillator on the preconduction current, the oscillation has a comparatively lower frequency and lower amplitude in contrast to the transmission signal;
   sensing a part of the light emitted from the laser diode and
   converting the sensed light into an electrical signal in the sensor;
   amplifying this electric signal in the broadband amplifier;
   rectifying the signal in the rectifier in order to generate a control signal;
   comparing the control signal with a standard signal in the comparator and generating an output signal with a value indicative of the result of the comparison step;
   forming a mean value of the output signal in the averager;
   adjusting the value of the preconduction current generated by the preconduction current generator based on the mean value.

3. Method according to claim 2, characterized in that the transmission signal is a digital signal.

4. Method according to claim 2, characterized in that the transmission signal is an amplitude discrete analog signal that is preferably frequency or pulse-position modulated.

5. Method according to claim 2, characterized in that the step of superimposing a periodic oscillation on the preconduction current comprises superimposing a sinusoidal oscillation on the preconduction current.

6. Method according to claim 5, characterized in that the frequency of the sinusoidal oscillation substantially equals 10 kilohertz.

7. Method according to claim 5, characterized in that the amplitude of the sinusoidal oscillation amounts to approximately 1% of the preconduction current amplitude.

8. The method according to claim 2, for use with a laser diode having a turn-on point at a threshold value of current characterized in that:
   the step of supplying comprises supplying an amount of preconduction current to the laser diode that corresponds to the threshold value of current needed to bias the diode to the turn-on point;
wherein the step of rectifying comprises:
   generating a control signal which exhibits negative half-waves indicating that the superimposed value of the preconduction current and the periodic oscillation has fallen below the threshold value of current at the turn-on point of the laser diode;
wherein the step of comparing comprises:
   comparing the duration of the negative half-waves of the control signal with the standard signal, and including the step of:
   deriving the standard signal from the periodic oscillation.

9. Apparatus for adjusting a preconduction current supplied to a laser diode to a turn-on threshold current value in the laser diode, the preconduction current is supplied to the laser diode by a source of current, the apparatus comprising:
   means for superimposing a selected pilot signal on the preconduction current, said means is operatively connected to
   means for sensing a variation in a modulated signal applied to the laser diode during a selected time interval of the pilot signal, said means for sensing is operatively connected to
   means for forming a relatively low frequency signal, proportional to the variation of the modulated signal, during the selected time interval of the pilot signal, said means for forming is operatively connected to
   means for comparing the relatively low frequency signal to a reference and for generating an output signal, said means for comparing is operatively connected to
   means for producing a mean value of the output signal generated by said means for comparing, and said means for producing is operatively connected to
   means for supplying the mean value signal to the source of current so as to adjust the value of the preconduction current to the turn-on threshold value of the laser diode to compensate for variations in the turn-on threshold current value of the laser diode.

10. Apparatus for adjusting a preconduction current to a threshold current value in a laser diode, the preconduction current is supplied to the laser diode by a source, comprising:
   means for superimposing a selected pilot signal on the preconduction current, said means is operatively connected to
   means for sensing a variation in a modulated signal applied to the laser diode during a selected time interval of the pilot signal, said means for sensing is operatively connected to
   means for forming an indicator signal, proportional to the variation of the modulated signal, during the selected time interval of the pilot signal, said means for forming is operatively connected to
   means for comparing the indicator signal to a reference, said means for comparing is operatively connected to
   means for producing a mean value of the output signal generated by said means for comparing, and said means for producing is operatively connected to
   means for applying the mean value signal to the source so as to adjust the value of the preconduction current to compensate for variations in the threshold current value of the laser diode.

11. The apparatus according to claim 10 including:
   means to compensate for variations in the preconduction current due to temperature changes and supply voltage variations.

12. The apparatus according to claim 10 for use with laser diodes which exhibit a first break-point at a current value corresponding to the threshold current value of the laser diode and which exhibit a second break-point at a higher value of current than the first break-point including:
   means to compensate for the second break-point of the laser diode.

* * * * *